Feb. 25, 1930.  H. J. MURRAY  1,748,725
RADIO LIGHT TRANSFORMING SYSTEM
Filed Sept. 22, 1925  2 Sheets-Sheet 1

Fig. 1.

Inventor:
Howard J. Murray
by Warren S. Arts

Feb. 25, 1930.    H. J. MURRAY    1,748,725
RADIO LIGHT TRANSFORMING SYSTEM
Filed Sept. 22, 1923    2 Sheets-Sheet 2

Patented Feb. 25, 1930

1,748,725

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

RADIO LIGHT-TRANSFORMING SYSTEM

Application filed September 22, 1925. Serial No. 57,856.

My invention relates in general to the variation of light and current by means of magnetic flux arranged to affect and be affected by light flux.

The further object of my invention is to broadcast, receive, record, distort, transfer, rectify and indicate the said variations of magnetic flux and light flux.

A still further object of my invention is to transfer light records and light variations from one place to another by means of high frequency radio energy.

Another object of my invention is to transform light variations into current variations at carrier current oscillating speed.

Still another object of my invention is to transform current variations into light variations at carrier current oscillating speed.

This application may be considered a further development of my invention described in Patent No. 1,629,727 electric wave producing and changing device, patented May 24, 1927.

In my Patent No. 1,629,727 there is described a means for producing a light sensitive high frequency field arranged to rotate or be rotated by a plane of polarized light. There is also shown and described a second light sensitive element forming a portion of an electric circuit and constituting a light affected cell. In this application the light sensitive cell is replaced by a light sensitive surface and means are disclosed enabling the light flux variations to be in effect sprayed at a high rate over the said light affected surface.

There is also disclosed suitable means for varying the said magnetic flux at a similar speed whereby the said variations may similarly affect the said light sensitive surface and thereby the visible result. In addition means are also disclosed for varying the said light flux at a similar speed whereby the said variations may similarly affect the said light sensitive flux and thereby the current transmitted circuit of a broadcasting station.

The theory of action for the purpose of this description may be stated as follows: There is an apparent relation between the ability of a highly oscillating field of flux to build up to its maximum strength or decrease to its maximum strength and the intensity of light flux present in the same space at the same instant. In other words, varying the light flux in the presence of a highly oscillating field of magnetic or static flux tends to prevent the said magnetic or static field of flux from building up in some proportion to the variation of light flux present. Applied to my invention such action of the said light variations causes in effect a light sensitive varying reluctance in the flux path and hence a corresponding variation of the impedances of the flux producing means. This in turn acts to vary the effective resistance and thus the form of the carrier current in the windings of the said flux producing means in approximate synchronism with the said light variations. In other words the light variations are in effect superimposed on the high frequency currents and may then be broadcasted by any means known in the art. This light affected broadcasted carrier current may be received, detected, rectified if desired, and amplified in any of the known ways or it may be simply amplified locally. In either event the carrier current is passed through the windings of the flux producing means and thus produces an oscillating flux which may affect and be affected by a plane of polarized light according to the said superimposed light records existing on same.

It should also be noted that an unaffected carrier current may be caused to produce an oscillating flux which may be positioned in the path of a ray of light varying in intensity due to its passage through a light record of variable density. This ray of light may then be focused on a rotating deflector as hereinafter described, and varied from a given path by the said suitably movable light deflecting element rotated and revolved about a given axis so as to cause the said ray when deflected to be projected at least once in a given interval of time over approximately all of the infinitismal portions of the said light record or light affected surface and thus record or superimpose the said record variations on the said carrier current or light sensitive surface thereby.

The invention further contemplates the use of colored light, a photographic film to be affected by the said varying light, a record film to affect the said light, means for varying the density of the said flux, means for recording the said light records, and also means for indicating the same. The invention still further contemplates the providing of means for distorting the said light records before they are broadcasted or transmitted and conversely the use of means for correcting or rectifying this distortion after suitable reception so that secret transference of the said records may be possible.

The invention allows numerous physical embodiments and two different types are herein illustrated for the purpose of showing the wide application of the invention, but it is understood that the showings in the drawings are largely diagrammatic merely being sufficient in detail to show the application of the invention.

Referring to the accompanying drawings:

In Fig. 1 there is shown a view largely diagrammatic of the arrangement of means and the necessary electrical connections to secure the transmission, reception, and recording of light records.

Fig. 2 shows a rotatable and reciprocal motor driven device designed to support, rotate and oscillate a light deflecting lens in a suitable manner to direct a ray of record affected light over the surface of the light holding element of Fig. 3 preferably in a spirally progressive manner.

Fig. 3 shows a sectional view of the light directing elements shown on Fig. 2 in detail and the method of rotating and oscillating same.

Fig. 4 shows a light record retaining element and means to adjust same to suitably receive and indicate light records in a given group for a desired interval when same are projected desirably in a spirally progressive manner against said element.

In Fig. 1 there is shown a mechanism containing casing 5 with ventilating and cooling openings 5A and having compartments 6 and 7. In compartment 6 there is shown a rotatable support 8 held in place by sockets 9 and 10 suitably secured to the casing 6 and equipped with set screws 11 whereby the support 8 may be securely fastened to the said casing. Mounted upon support 8 are a plurality of secondary adjustable supports 12, 13 and 14 each equipped with set screws and having extension arms 15, 16 and 17 respectively.

On arm 15 is mounted a light emitting element 18 equipped with a suitable reflector 19 and connected to a source of variable voltage power 20. On adjustable arm 16 there is adjustably mounted a set of condenser lenses 21, and on arm 17 there is adjustably mounted a suitable focusing lens 22. Suitably mounted on inner wall 23 is an adjustable light aperture 24. Such an arrangement is well known and admitted in the art. My only object in using same is to concentrate the powerful ray of light on reflecting surfaces 26 suitably mounted on a rotatable motor driven drum 27 having an axis 28 and desirably geared to motor 29 adjustably mounted on an arm 30 movably secured to the universal support 31 so that the said motor and said drum may be desirably adjusted in three planes to properly reflect the said beam 25 over suitable adjacent portions of the movable light record 31 assumed to be for the purpose of this description a photographic film upon which light records have previously been deposited or recorded. The film is assumed to be moving at right angles to the plane of the drawing and mounted upon motor driven drums not shown.

The rays of light 32 are thus caused to oscillate in effect in one direction once for each movement of each of the reflecting surfaces 26 and the motion of said ray when oscillated is according to the sine law if the said surfaces lie entirely within a given plane, said plane at right angles to the axis 28. The movement in effect of the said ray 32 may therefore be many times the speed of the said axis 28 and is limited only by the number of reflecting surfaces 26 it is physically possible to mount on the said drum 27.

Hence with the ray 32 travelling over the surface of the moving record 31 small adjacent similar areas of the said record surface will be successively and uniformly positioned in the path of the said oscillating ray 32 and hence vary the said ray according to the density of the said record element or record previously placed on the surface of the area 31 and accordingly a varying light ray 38 will impinge on the lens 34 preferably convex. This will be true if the lens 34 is symmetrical to a given axis. The said lens 34 is adjustably supported by support 35, adjusting arm 36, and universal support 31. The deflected rays 38 will converge to lens 39 suitably mounted for movement in three planes by support 40, adjustable arm 41, handle 40A and universal support 31. By means of lens 34 and lens 39 the ray 38 is caused to be concentrated to the beam 42 and to move in an approximate given line as 42 and then pass through a coloring medium 43 suitably mounted on support 44, adjustable arm 45 and universal base 31 so as to be movable in three planes.

The colored record affected ray now designated as 46 is then passed through a light polarizing element 47 such as a tourmaline crystal. This element 47 is mounted for rotary movement in a plane perpendicular to the axis of the beam 46 by means of adjustable handle 48 and additionally arranged to be adjusted in any suitable position due to supporting post 49, set screw 37 and universal support 31 and also slidable holding means 50.

The colored record affected polarized ray of light now designated as 51 on the drawing is passed through a portion of a magnetic flux path 51A having other path portions 52 and 53 suitably supported to casing 5 by an adjustable holding means 77. Flux producing means 54 and 57 are suitably coiled about the flux path portions 51 and 52 to produce a desired flux or combination of fluxes therein. Flux means 54 is suitably connected to an external source of power by means of leads 55 and 56 and adjustable rheostat 55A. Flux producing means 57 is connected to a carrier current or high frequency source of power 61 which may be a radio sending or receiving organization as known in the art and having a common lead 63 to two-way switch 66 connecting same to aerial 65 by means of lead 64 or to a wired radio system by means of lead 67, condenser 78 and conductor 68. Lead 62 connects the station 61 to ground 62A.

Switch 60 permits the lead 59 to be open thereby to introduce leads 67 and 70 connected to a detector unit 71 which in turn is connected by leads 72 and 73 to an amplifying unit 74 and thence to suitable receivers (not shown) by leads 75 and 76.

The polarized record affected ray 51 is then passed through an analyzer 79 mounted for rotary motion in a plane perpendicular to the axis of ray 51 for rotary motion by means of adjustable handle 80 and supported on a standard 81 to casing 5. The analyzed light 82 is then passed through a variable light aperture 83 adjustable by means of a handle 84, holder 85 and supported by casing 5. The polarized record affected analyzed ray shown on the drawings 86 is then passed through a diverging lens 87 suitably mounted and supported for adjustment by handle 88, adjustable extension support 89, universal support 31 and set screws 37. After passing through lens 87 the said affected condensed ray 97 is concentrated in lens 90 designed to suitably concentrate same on rotating reflecting surfaces 91. Lens 90 is suitably supported on adjustable standard 91 and universal support 31.

The reflecting surfaces 91 are suitably fastened to a revolvable drum 92 rotating on axis 93 driven by motor 94, adjustably mounted on post 95 and universal support 31. The leads 96 are connected to a source of power, preferably the same source as the leads 29A to motor 29 are connected, and the motors 29 and 95 are preferably of similar characteristics. The reflected oscillating ray is then permitted to move in one direction across a light sensitive or photographic surface 98 suitably mounted for movement on motor driven drums 99 and 100, and actuated by motor 101, having leads 102, adjustable on supports 103, suitably fixed to casing 5. The motor 101 is preferably connected to the same source of power as motors 29 and 94 and the motor moving element 31, and is attached to drum 99 so that its motion will bear a definite relation to the motion of surfaces 26, 91 and record element 31.

At this point we should note that light records of 31 are being simultaneously broadcasted from antennae 65 or over conductor 68 and is also being recorded on photographic surface 98.

In Fig. 2 there is shown a motor 104 of desirable characteristics. This motor is mounted on an adjustable pedestal 105 designed to be rotated and guided, and suitably positioned on the support 106 by set screw 107. The support 106 is additionally secured to universal support 31 by means of fastener 108 and bracket 109. It is evident that the elements mounted on support 106 of Fig. 2 may replace when so desired the elements mounted on supports 30 and 95 of Fig. 1. The said motor 104 is securely fastened to pedestal 105 by means of bolts 110 and is equipped with a driving element 111 mounted on its shaft, insulated brushes 112 and commutator 113. Securely fastened to motor 104 a shaft bearing 114 supporting a hollow shaft 115 upon which is mounted a driven element 116 co-actively associated with driving element 111. Surrounding the right hand end of shaft 115 is a magnet winding 117 supported by casing 118 rigidly connected to motor 104. Carried by the right hand end of shaft 115 is a light deflecting lens 119 (see Fig. 3) arranged to be rotated by the said shaft 115 and oscillated or reciprocated by the action of the said magnet 117 actuating an armature 125 (see Fig. 3).

On Fig. 3 there is shown the shaft 115 of Fig. 2 with the end portion 120 formed to permit a spherical shaped lens holding element 121 to move easily therein about a given center 122. Embedded in the spherical element 121 so as to be positioned symmetrically relative to the center 122 is a light deflecting lens 119. The entire motor and motor driven arrangement is adjustable as hereinbefore described by means of supports 106 and 31 so that the ray of light 97 or 25 will at all times lie in the plane of the point or center 122. A recess 128 formed in spherical element 121 is designed to receive actuating finger 124 attached to slidable armature 125 and arranged to move in the slot 125A. The armature 125 is designed to axially slide on the shaft 115 against the resistant spring 126 when suitably attracted by the flux produced by the windings 127. This flux is intermittently and synchronously energized by connection to a suitable source of power 135 through commutator 113 (see Fig. 2) and conductors 129 and 130, 131, 132 and 133 and switch 134.

In Fig. 4 there is shown a light retaining surface 137B suitably mounted to intercept the light directed by the elements shown in Figs. 3 and 4. A surface 137B preferably circular, although obviously it could be of any desired shape is suitably mounted in a holder 138 ending in a base 139 slidably and rotatably mounted on support 140 and fastened to same by means of set screw 141. Support 140 may be mounted on universal support 31 of Fig. 1 and the surface 137B may be replaced by surface 137A upon which light records have previously been recorded.

It should now be noted that we are able to broadcast light records from antennæ 65 or conductor 68 and simultaneously indicate same on light holding surface 137B and as hereinbefore described records said light records on photographic surface 98.

In operation it is assumed that the leads 20 of Fig. 1 are connected to a suitable source of power and thus convey a variable voltage to the source of light 18 and thus permit, as hereinbefore described, a ray of polarized record affected light to co-actively associate with the carrier current flux to thereby superimpose in effect the said light records on the said carrier current. It should be noted that the flux producing energy may be obtained from a source of power connected to the leads 55 and 56, including an adjustable rheostat 56A in the circuit.

The flux obviously may also be produced from a permanent magnet 53 when the material of 53 is suitably magnetic, but it may obviously be of non-magnetic material when so desired. Hence we may have a combined flux as is commonly found in the ordinary telephone receiver varying only by the amount of flux produced from the oscillating current flowing in the windings of 57 obtained from a radio receiving means 61. Hence we have a record affected high frequency current flowing in the transmitter circuit of station 61. We should also note that the beam 51 when properly analyzed and focused by lens 90, oscillated by surface 91 may be recorded on the moving light affected surface 98 that it is possible to simply transfer light records from element 31 to element 98. It is possible to transfer a distorted record from element 31 to element 98 due to variation of the relative angular position of the analyzer 79.

Up to this time we have been concerned with the sending or broadcasting, recording and indicating of light records and I will now describe the reception of such records for recording or indicating same. We will assume that the element 31 has been removed, that the motor 29 is motionless with one of the surfaces 26 in a suitable position to reflect ray 25 whereby a steady ray 51 is being polarized by means of 47. Any superimposed record affected broadcasted energy assumed to have been broadcasted from a similar system as hereinbefore described containing the record affected element 31 may be received by antennæ 61 detected, rectified, and amplified by any means known in the art and passed through the windings of element 57. A record affected flux will be produced by same and will rotate the said polarized ray 51, as hereinbefore described, and thus can be recorded on element 98 as hereinbefore described.

It should be noted that the organization becomes a sending or receiving system by the removal or addition of element 31 in the control of the motor 29, as it is evident that an oscillating current may be formed in a broadcasting organization as 61 and an unaffected high frequency current passed through the windings 57 when switch 60 is closed. If record element 31 is now replaced and the motor 29 is again energized, the beam 51 will again become record affected and thus affect the high frequency current flowing in winding 57 and leads 58 and 59, as hereinbefore described. This record affected current may be broadcasted by wire or space, due to station 61, lead 63, switch 66, antennæ 65, condenser 78 and conductor 68 by any known methods. By opening switch 60 this record affected current either during sending or receiving, may be locally detected by detector element 71 connected by leads 69 and 70 and amplified by element 74, connected to detector 71 by leads 72 and 73 and to a local receiver by leads 75 and 76. Therefore the records of element 31 may be broadcasted, received, recorded or indicated and also locally reproduced at a speed limited only by the action of light on magnetic flux and the speed of the motor multiplied by the number of reflecting surfaces physically possible. As each oscillation may cover a narrow strip of element 31, such oscillation will of course cause many variations of the beam 38. As an example motors of small diameter and torque are now made to revolve elements faster than twelve thousand times per minute. Even at this speed and with one hundred surfaces I could produce a million, two hundred thousand, oscillations of beam 38 per minute or twenty thousand oscillations per second. As each beam oscillation could easly pass light records to cause two hundred variations in same I could produce at least four million variations per second in the polarized beam 51. All of these variations would be superimposed on the oscillating current flowing in 57, as hereinbefore described. The current could have a frequency of, say four million per second and each wave would represent one record, or of course it could be of such a frequency that several waves would carry one record or several records could be superimposed on one wave.

I will now describe the method of causing the received broadcast records of element 137A to become visible on light holding surface 137B. I employ the arrangement shown on Figs. 2, 3 and 4 to replace the motor driven reflecting surfaces 26 and 91 and the record affected element 31. I also remove photographic surface 98. It is further assumed that the ray 25 is produced in the axis of the shaft 115 by moving the elements in compartment 6 of the casing 5 through an angle of 90°.

The motor 104 is assumed to be of any desired type, preferably of the synchronous form and of the highest possible speed and connected to a source of power by conductors 28. Because of the small torque required the speed may obviously be very high and by means of the gears 111 and 116 a still higher speed may be imparted to the hollow shaft 115 securely held and guided by bearings 114 supported by motor 104. A lens 119 (see Fig. 3) is embedded in the dense material 121 so as to form a perfect sphere, having openings 121A and 121B, the normal axes of which lie in the axis of the beam 25 and the lens 119 is so positioned that it is symmetrical to this said axis.

Hence it may be rotated by the shaft 115 due to its connection with finger 124 and oscillated by the said finger as hereinbefore described. The holding portion 120 having a surface 120A designed to guide the spherical lens holding element 121 as it is oscillated, is suitably fastened to the said shaft 115 by means of screws 115A and the recess 128 is provided to receive the finger 124 moving in the plane of the beam 125 so as to reciprocate the said spherical element 121, and thence the lens 119 as it is rotated by the shaft 115. The pin 124 is securely fastened to armature 125 slidably mounted on holder 120 to move axially along the same against spring 126, positioned against stop member 120B. The magnet holder 118 (see Fig. 2) securely holds magnet winding 127.

Hence when motor 104 is rotated and properly adjusted by means of set screws 107 and supports 106 and 31 the beam 25 will be deflected by lens 119 as it is rotated by shaft 115 and oscillated by magnet armature 125. Magnet winding 127 is connected to brushes 112, a commutator 113 mounted on the motor shaft and to a source of power by means of switch 134 and conductors 129, 130, 131, 132 and 133. It is apparent that such deflection will cause the beam of light 25 to be projected spirally in a progressive uniform manner as may be shown by beam 25A. The magnet winding 127 may be desirably actuated at intervals bearing a definite relation to the speed of the motor 104 and it is evident that an oscillation may occur for a given number of revolutions of said motor. The motion of the oscillation may be further desirably affected by a suitable resistant member or spring 126 which by its variable tension may further affect the motion of armature 125.

We have assumed that the elements mounted on supports 30, 36, 95 and 103 are now removed from Fig. 1, as well as the moving record 31. The ray 25 may be assumed to come from its source in line with beam 51 and we may mount on universal support 31 two duplicate sets of the elements supported by supports 106 and 140 in Figs. 2 and 3. It should be further noted that for the purpose of description I designate one set as "sending" and the other as "receiving" and that the sending set has a record affected element 137A and the receiving set a light holding element 137B and that of course the receiving set is remotely positioned relative to the sending set. In order to avoid useless drawings and simplify the description, I am using Fig. 1 in both instances.

The sending set will of course be positioned on the left of lens 34 so that the rays 25A will pass through portions of record affected partially transparent element 137A of Fig. 4 and thence to the lens 34 in a progressively spiral uniform manner as the lens 119 of Fig. 3 is rotated and oscillated. These variations will then be superimposed and broadcast by element 61, as hereinbefore described.

Similar broadcasted records may also be received by 61 and transferred to polarized beam 51 and hence be projected on the lens 119 as beam 97 and in effect sprayed over the surface of light record indicating element 137B.

It is assumed that the motors 104 are connected to sources of power having the same frequency and that they may be adjusted to maintain a fixed angular relation so that the progressive spiral motion of ray 25A is identical to that of ray 97B and that the areas of 137A and 137B are similar as to size and shape.

As the element 137B is designed with material able to retain light for a given time many of the records will be visible at the same time.

I provide means able to project the said records in a progressive spiral manner at a sufficient speed so that all the light records will be visible for a given time and hence the records of element 137A are all visible on element 137B.

By means of the device disclosed it is possible to provide a highly efficient and very rapid light record broadcasting, receiving, transferring, recording, distorting, rectifying and indicating system which may be entirely automatic in its operation.

When broadcasted and received over a power system or systems in synchronism it is apparent that all the motors of the sending and receiving devices may be in synchronous motion or in definite angular relation and thus maintain in their driven elements definite relation between the sent and received record and its indication, record or transfer.

It should also be noted that light variations may be locally amplified without broadcasting same and that light records may be changed to sound records, or sound records to light records. In addition the records on element 31 may be placed in spiral formation so that element 31 may present a new group of records, as shown by element 137A to be broadcasted or transferred to the element 137B and thereby provide on the surface of 137B an apparently continuous visible group of records which may or may not be similar for a given instance of time.

While I have shown and described and have pointed out in the annexed claims certain novel features of my invention, it will be understood that various omissions, substitutions, and changes in the form and details of the device illustrated and in its operation may be made by those skilled in the art without departing from the spirit of the invention.

Having thus described my invention, I claim—

1. The combination of a light susceptible circuit element arranged to create a high frequency field of magnetic flux positioned to intercept a ray of light flux, means for varying the said light flux including a relatively movable light record, and means for associating the said light susceptible circuit with a broadcasting system.

2. The combination of a source of carrier current energy forming a portion of a radio transmitting system, including a light affected flux producing portion, means for co-operatively associating the said flux to affect and be affected by plane polarized light, means for producing, varying, coloring and intercepting the said polarized light, and means for suitably adjusting the above named means relative to each other.

3. The combination of a source of radiant energy of a desired wave length forming a portion of a circuit containing a light susceptible flux producing element and associated with a broadcasting circuit, means including a source of variable light, a light record varying element, and a light polarizing element, and means designed to permit the said polarized light to affect and be affected by the said flux producing means thereby to change the status of the said circuit and therewith the status of the said broadcasting circuit.

4. In a light record broadcasting device, means to generate an oscillating current of carrier frequency, means to produce a magnetic flux from said current, said flux varying at carrier frequency, and means to produce a light flux from the light record and to pass said light flux through said magnetic field, whereby the impedance offered by said flux producing means to said carrier current is varied.

5. In a device for broadcasting light records at a carrier current frequency, the combination of a carrier current generator, a magnetic flux producing means operated by the carrier current, a source to produce a beam of light passing through the produced magnetic flux, and means to plane-polarize the light beam between said source and said flux to a degree proportioned to the intensity of the light record to be transmitted, whereby the impedance of said flux producing means to the passage of said carrier current is varied in proportion to the intensity of the light record.

6. In a light record transmitting system, means for producing a still flux and means for producing a high frequency flux, means for combining the said fluxes and cooperatively associating same with a light record affected beam of polarized light thereby to vary the status of the said circuit of which the said high frequency flux producing means is a portion and means for rectifying the said high frequency energy and impressing same on a circuit including a source of unidirectional current.

7. In a device of the class described, means to produce and vary a direct current flux, means to produce a high frequency oscillating current magnetic flux, said magnetic fluxes having a common field, means to produce a light flux varying in intensity with the light record to be transmitted, and means to pass said light flux through the common magnetic field.

8. A method of broadcasting light records by carrier energy which comprises generating an oscillating current of carrier frequency, producing a magnetic flux from said current so that said magnetic flux varies at carrier frequency, producing a light flux from the light record to be broadcasted, and passing said light flux through said magnetic flux whereby to vary the impedance offered to the carrier frequency current.

9. The method of producing a fluctuating current for fac-simile transmission which consists in generating a high frequency current, employing said high frequency current to create a high frequency magnetic field, and varying the reluctance of said field by a ray of light so that thereby the amplitude of the high frequency current waves is caused to fluctuate.

10. In a device of the class described, a circuit including a source of direct current and means energized thereby to produce magnetic flux, a second circuit including a source of high frequency current and means energized thereby to produce a varying magnetic flux, said fluxes traversing a common field, and means to pass a ray of light through said field to vary the reluctance thereof whereby to modulate the high frequency current.

11. In a device of the class described, a circuit including a source of high frequency current and means energized thereby to produce a varying magnetic flux traversing a field, and means to pass a ray of light through said field to vary the reluctance thereof whereby to modulate the high frequency current.

12. In a device of the class described, a circuit including a source of high frequency current and means energized thereby to produce a varying magnetic flux traversing a field, and means to pass a ray of light through said field to vary the impedance of said means whereby to modulate the high frequency current.

13. The method of producing a fluctuating current for fac-simile transmission which consists in generating a high frequency current, employing said high frequency current to create a high frequency magnetic field and varying the impedance opposed to said current by passing a ray of light through the field so that the amplitude of the high frequency current waves is caused to fluctuate.

Signed at New York, in the county of New York and State of New York, this 21st day of September A. D. 1925.

HOWARD J. MURRAY.